US011115813B1

(12) United States Patent
Parker et al.

(10) Patent No.: US 11,115,813 B1
(45) Date of Patent: Sep. 7, 2021

(54) SOFTWARE DEFINED WIRELESS LOCAL AREA NETWORK FOR FAULT TOLERANCE

(71) Applicant: Amazon Technologies, Inc., Seattle, WA (US)

(72) Inventors: Erik R. Parker, Danville, CA (US); Trent Allie, Kirkland, WA (US); Andrew Michael Johnson, Middletown, DE (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/209,557

(22) Filed: Dec. 4, 2018

(51) Int. Cl.
| | |
|---|---|
| H04W 4/00 | (2018.01) |
| H04W 8/30 | (2009.01) |
| H04W 76/18 | (2018.01) |
| H04W 76/12 | (2018.01) |
| H04W 88/14 | (2009.01) |
| H04L 12/707 | (2013.01) |
| H04W 84/12 | (2009.01) |

(52) U.S. Cl.
CPC ............... *H04W 8/30* (2013.01); *H04L 45/24* (2013.01); *H04W 76/12* (2018.02); *H04W 76/18* (2018.02); *H04W 88/14* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 8,451,752 | B2 * | 5/2013 | Lu ........................ | H04L 12/4633 370/254 |
| 2011/0307546 | A1 * | 12/2011 | Iovene .................... | H04L 45/00 709/203 |
| 2015/0139127 | A1 * | 5/2015 | Oh ....................... | H04L 25/0204 370/329 |
| 2016/0212745 | A1 * | 7/2016 | Hiertz ................. | H04L 61/6022 |

\* cited by examiner

*Primary Examiner* — Zewdu A Beyen
(74) *Attorney, Agent, or Firm* — Patterson + Sheridan, LLP

(57) ABSTRACT

Techniques are described for providing fault tolerance for wireless communications in a wireless network (e.g., wireless local area network (LAN)). A client establishes a first connection with a first access point (AP) of multiple APs via first radio of the client and a second connection with a second AP of the multiple APs via a second radio of the client. The first AP and the second AP are connected to the same wireless LAN. Data associated with a communication session is communicated via the first and second connections. In response to detecting that the second connection satisfies one or more criteria, a third connection is established with a third AP of the multiple APs via the second radio of the client.

17 Claims, 12 Drawing Sheets

SOFTWARE DEFINED WIRELESS LOCAL AREA NETWORK FOR FAULT TOLERANCE

BACKGROUND

The present disclosure generally relates to wireless communication, and more specifically, to improved techniques for providing fault tolerance for communications within a wireless local area network (LAN).

Wireless LANs have emerged as one of the predominant networking solutions for providing network connectivity to clients in a given environment. Today, for example, wireless LANs are often deployed in a variety of different environments, including indoor environments, such as office buildings, manufacturing facilities, warehouses, hospitals, schools, homes, etc., and outdoor environments, such as stadiums, construction sites, college campuses, parks, shopping outlets, etc. A wireless LAN is a flexible data communications system that can be implemented as an extension to, or as an alternative to, a wired LAN. Using radio frequency (RF) technology, wireless LANs transmit and receive data over the air, minimizing the need for wired connections. Wireless LANs thus facilitate user mobility and rapid field deployment when compared to wired LANs.

A wireless LAN typically employs several access points (APs) within an environment to provide network connectivity to clients. Each AP acts as a bridge between the clients in its cell (or coverage area) and the backhaul network. APs can be deployed in the wireless LAN with overlapping cells to allow clients to roam throughout the environment and maintain network connectivity. In traditional wireless LANs, each client is equipped with a single radio, which the client uses to connect to different APs. With a single radio, however, such clients can lose connection to the wireless LAN (e.g., when roaming between APs, encountering AP failures or backhaul network failures, etc.) and experience data interruptions. These data interruptions, in turn, can significantly impact performance of the clients.

DETAILED DESCRIPTION

Figure 1:
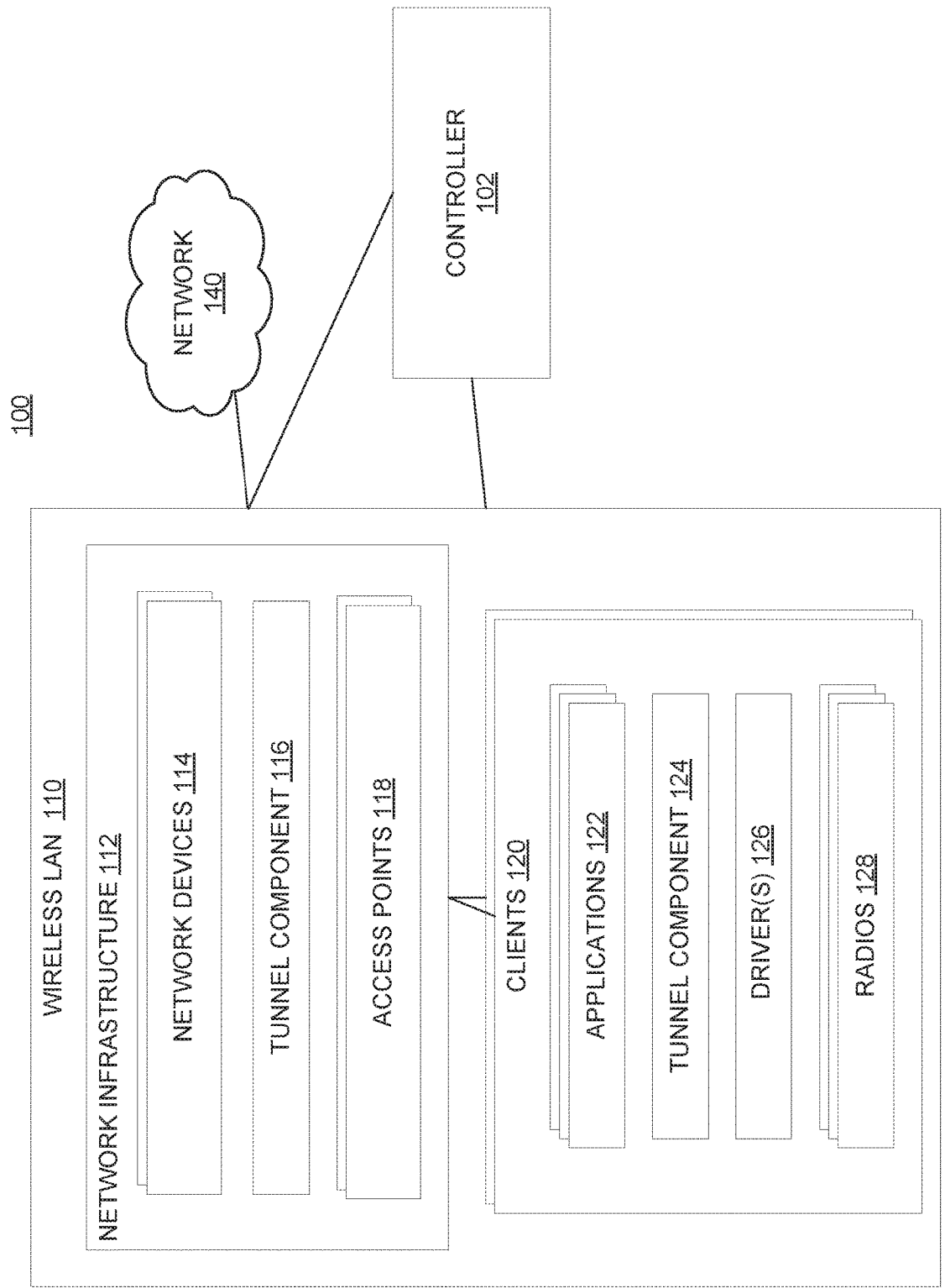
FIG. 1 is a block diagram illustrating an example communication system with a wireless LAN, according to one embodiment.

Multiple APs can be deployed within a wireless network (e.g., wireless LAN, such as an Institute of Electrical and Electronics Engineers (IEEE) 802.11 wireless LAN) to provide network connectivity to a client as it moves throughout an environment. Within such networks, the client is typically equipped with a single radio (e.g., IEEE 802.11 radio) for connecting to the various APs. For example, as the client moves out of range of a first AP and into range of a second AP, the client's radio can automatically switch from the first AP to the second AP to access the network. During this transition, the client is temporarily offline, causing interruptions in the client's communications. In addition to roaming interruptions, clients that are equipped with a single radio can also experience data interruptions due to other system faults, such as access point failures/bugs, failures in the network backhaul, etc. Data interruptions can significantly reduce the reliability and performance of latency sensitive applications, such as industrial control applications, voice over internet protocol (VoIP) applications, etc.

In current techniques for addressing network failures, manual intervention is often employed to resolve network connectivity issues with a particular AP. For example, the user may manually move the client (e.g., laptop) from an AP associated with the failure into the range of another AP to regain connection with the network. For some clients (e.g., robotic drive units and safety apparatus), however, manually intervening when the client has encountered a problematic AP can be infeasible. For example, a building that has multiple robotic drive units deployed within can pose safety hazards for users that enter to manually intervene with a given robotic drive unit, which has stopped working due to losing connection to the network via one of the APs in the building. At the same time, stopping (or pausing) operation of the robotic drive units to manually intervene with a given robotic drive unit can reduce efficiency and productivity. Accordingly, it may be desirable to provide improved fault tolerance techniques for clients communicating in a wireless network (e.g., wireless LAN).

Embodiments described herein provide techniques that enable clients to roam between APs within a wireless LAN (e.g., IEEE 802.11 wireless LAN) while maintaining a communication session with the wireless LAN. In one embodiment, a client includes multiple radios (e.g., IEEE 802.11 radios), which are used to connect to the same wireless LAN. If a client includes two radios, for example, the client can connect to a first AP via a first radio and connect to a second AP via a second radio. Each AP in the wireless LAN is associated with a network infrastructure that corresponds to a different physical path within the wireless LAN. For example, the first AP can be located in a first network infrastructure corresponding to a first physical path through the wireless LAN and the second AP can be located in a second network infrastructure corresponding to a second physical path through the wireless LAN.

In one embodiment, the client uses a multipath transport protocol (e.g., multipath transmission control protocol (TCP)) to establish tunnels between the (first and second) radios of the client and an endpoint in the wireless LAN. When participating in a communication session with a host, the client uses the multiple radios to send and receive the same data through the tunnels, which travel over distinct paths through the wireless LAN. Doing so allows the client to maintain the communication session in the event one of the client's radios loses connection with the network due to, e.g., roaming between APs, an AP failure, a backhaul network failure, a radio malfunction, etc.

Many of the following embodiments use a client equipped with two radios (e.g., 802.11 radios) as a reference example of a client that uses multiple radios to connect to the same wireless LAN. Those of ordinary skill in the art will recognize that embodiments presented herein can be applied to clients that use more than two radios to connect to the same wireless LAN.

FIG. 1 is a block diagram of a communication system 100 for providing fault tolerance to clients 120 within a wireless network (e.g., a wireless LAN 110), according to one embodiment. As shown, the communication system 100 includes a wireless LAN 110 connected to a controller 102 and a network 140. The network 140, in general, may be a wide area network (WAN), a LAN, a wireless LAN, a personal area network (PAN), a cellular network, etc. In a particular embodiment, the network 140 is the Internet. In one embodiment, the communication system 100 operates in accordance with a wireless standard, such as an IEEE 802.11 standard.

Generally, the controller 102 is a central entity that manages and configures policies on devices (e.g., network devices 114, APs 118, clients 120, etc.) within the wireless LAN 110. In addition to forwarding data plane traffic, the network 140 may forward management or control plane traffic between the controller 102 and the wireless LAN 110. In some embodiments, the communication system 100 may be implemented as a Software Defined Network (SDN). When implemented as a SDN, the control plane of the communication system 100 that makes decisions about where traffic is sent is decoupled from the underlying data-plane of the communication system 100 that forwards traffic to a selected destination. Thus, from a management perspective, the controller 102 (e.g., SDN controller) of the communication system 100 manages and configures the policy on device(s) (e.g., network devices 114, APs 118, clients 120, etc.) within the wireless LAN. Additionally, or alternatively, the controller 102 can manage network traffic that flows through the wireless LAN 110.

The wireless LAN 110 includes a network infrastructure 112 and clients 120. The network infrastructure 112 provides the clients 120 with an uplink to the network 140 (e.g., the Internet). In one embodiment, the network infrastructure 112 is representative of the wired backhaul network of the wireless LAN 110. As shown, the network infrastructure 112 includes network devices 114, a tunnel component 116, and APs 118. The network devices 114 are representative of a variety of physical networking (sub)-infrastructure, including networking equipment rooms (e.g., main distribution frames (MDFs), intermediate distribution frames (IDFs), etc.), networking hardware (e.g., routers or gateways, switches, cabling, etc.), servers, racks, and the like. Within the network infrastructure 112, the network devices 114 can be coupled to the APs 118 via wired links, wireless links, or a combination of wireless and wired links.

Each AP 118 (also referred to as wireless AP) deployed within wireless LAN 110 forms a cell (also referred to as a coverage area, basic service set (BSS), radio cell, etc.), which enables clients 120 located within the cell to connect to the AP 118. This allows the client(s) 120, for example, to communicate with other clients 120, access resources (e.g., servers, storage, input/output (I/O) devices, applications, etc.) within the wireless LAN 110, and connect to the network 140. Clients 120 (also referred to herein as stations, wireless clients, STAs, etc.) are representative of a variety of computing devices, including a laptop computer, mobile computer (e.g., a tablet or a smartphone), digital media player, a gaming device or system, a navigation (e.g., global positioning system (GPS)) device, a drone, a drive unit, a robot/robotic device, a wearable device (e.g., identification badge/card), or any other suitable device that is configured to communicate via a wireless medium. The clients 120 and APs 118 operate pursuant to a wireless protocol, such as an IEEE 802.11 standard.

Each client 120 includes application(s) 122, a tunnel component 124, one or more drivers 126, and radios 128. Radios 128 enable the client 120 to connect to (or associate with) the APs 118, e.g., in order to access the wireless LAN 110 and network 140. In one embodiment, each radio 128 is an IEEE 802.11 radio. A client 120 can use the radios 128 to connect to (or associate with) multiple different APs 118 within the wireless LAN 110. For example, assuming a client 120 includes a first radio and a second radio, the client 120 can connect to a first AP 118 in the wireless LAN 110 via the first radio and connect to a second AP 118 in the (same) wireless LAN 110 via the second radio. As described below, equipping a client 120 with multiple radios 128 that can connect to the same wireless LAN 110 allows the client 120 to send and/or receive data (e.g., packets) associated with a communication session from the radios 128 across multiple redundant paths through the wireless LAN 110. By communicating data across multiple redundant paths, embodiments can significantly reduce the likelihood of a client 120 losing connection with the network (e.g., due to roaming, AP failures, network infrastructure failures, etc.), relative to clients equipped with a single radio that connects to a given network.

The driver 126 controls the connection (or association) procedure of radios 128 to the APs 118. In some embodiments, the client 120 may include multiple drivers 126 for the radios 128 (e.g., radios from different manufacturers may have different drivers). In one embodiment, the driver 126 performs an association protocol, such as 802.11 association, to connect (or associate) each radio 128 to a different AP 118. In an association protocol, the driver 126 can use a radio 128 to scan channel(s) for information contained within beacons transmitted by an AP 118. Such information can include, but is not limited to, the network name (e.g., service set identifier (SSID)), unique identifier associated with the network name or the AP 118 (e.g., media access control (MAC) address, such as the basic service set identifier (BSSID)), security capabilities, operating channel(s), client load (e.g., the number of clients connected to the AP), channel utilization, etc.). In some embodiments, rather than scan channel(s) for information contained within beacons, the driver 126 can send a request (e.g., a 802.11 probe request frame) on channel(s) via the radio 128 for information on one or more APs 118, and receive a response (e.g., 802.11 probe response frame) that includes the information.

Based on the information obtained from the scan and/or probe response, the driver 126 determines which AP 118 to connect to a radio 128. In some embodiments, the driver 126 can determine the set of APs 118 that are available to connect to a radio 128, based on the set of networking devices 114 (e.g., physical networking sub-infrastructure) the set of APs 118 belong to within the network infrastructure 112. For example, when installing the APs 118 into an environment (e.g., site), the APs can be deployed to different sets of networking devices 114 within the environment, where each set of networking devices 114 corresponds to a different physical path through the network infrastructure 112. Assume, for example, that a thousand APs are available to be deployed within a building. In this example, five hundred APs can be deployed (or connected) to a first IDF within the building and five hundred APs can be deployed (or connected) to a second IDF within the building to create two distinct physical paths through the network infrastructure 112 of the building. Continuing with this example, a first path is created by the network devices 114 and APs 118 connected to the first IDF and a second path is created by the network devices 114 and APs 118 connected to the second IDF. In some embodiments, the APs 118 can be deployed throughout an environment such that at least one AP 118 connected to the first IDF and at least one AP 118 connected to the second IDF is available for every location in the environment. Doing so provides clients 120 with redundant paths through the wireless LAN 110 (e.g., for communicating data) at every location within the environment.

As described further below with reference to FIGS. 3-6, the driver 126 can determine which APs 118 belong to the different sets of network devices 114 within the network infrastructure 112 based on at least one of: a configuration obtained from the controller 102, beacons received from the APs 118, frequency configuration for the client 120 (e.g., sets of frequencies configured for each radio 128), and network configuration for the client 120. In one embodiment, the driver 126 can establish a connection (or data link) with a particular AP 118 via a radio 128 by exchanging association messages (e.g., 802.11 association request/response frames) with the particular AP 118 via the radio 128. For example, the driver 126 can send an association request, via the radio 128, to the particular AP 118, and receive an association response, via the radio 128, granting the client 120 access to the AP 118. The client 120 can then begin exchanging data over the connection established between the radio 128 and the AP 118 to access wireless LAN 110. In some embodiments, the driver 126 can perform an authentication protocol (e.g., 802.11 authentication) prior to performing an association protocol in order to authenticate each radio 128 to the wireless LAN 110. As part of the authentication protocol, each radio 128 on the client 120 may be assigned to a different logical subnetwork (or subnet) (e.g., virtual LAN (VLAN)) of the wireless LAN 110. The differentiated subnetworks enable the client 120 to communicate data (from the radios 128) through the distinct paths of the network infrastructure 112.

The application(s) 122 generally communicate data with the wireless LAN 110 across communication tunnels (e.g., IP tunnels) established with the tunnel component 124. In one embodiment, the tunnel component 124 uses a multipath transport protocol (e.g., multipath TCP) to create multiple tunnels between the client 120 and the tunnel component 116 (e.g., end point) in the network infrastructure 112. For example, the multipath transport protocol generally allows the use of multiple paths for communicating data between peers. In some embodiments, a separate tunnel can be created for each radio 128 on the client 120. Each tunnel between the client 120 and the tunnel component 116 carries data (e.g., packets) from a communication session through a different path in the network infrastructure 112.

In one embodiment, the tunnel component 124 provides a tunnel interface (e.g., "interface tunnel 0") to application(s) 122. For example, an application 122 can send a packet to the tunnel interface in order to start a communication session (e.g., TCP connection/session). In one embodiment, when a packet arrives at the tunnel interface, the tunnel component 124 uses the multipath transport protocol (e.g., multipath TCP) to send the packet (from the radios 128) through the multiple tunnels to the tunnel component 116, which is the endpoint of the tunnels. Once received at the tunnel component 116, the tunnel component 116 keeps one of the packets (e.g., received from one of the tunnels) and routes the packet to the network 140 via one or more of the network devices 114 (e.g., routers). The tunnel component 116 can discard the remaining packets received from the other tunnels. Similarly, upon receiving a packet (e.g., from network 140) at a tunnel interface provided by the tunnel component 116, the tunnel component 116 sends the packet across the multiple tunnels established between the client 120 and the tunnel component 116.

The APs 118 can be deployed with overlapping cells to allow clients 120 to roam throughout the coverage area of the wireless LAN 110. In one embodiment, the driver 126 controls the roaming of radios 128 between the APs 118 for the client 120. In one embodiment, the driver 126 configures each radio 128 on the client 120 to roam between a different set of APs 118 (e.g., belonging to a different set of network devices 114 within the wireless LAN 110). The driver 126 may trigger each radio 128 to roam to a different AP 118 based on detecting one or more roaming conditions. For example, the roaming conditions may include, but are not limited to, a signal strength of an AP 118 below a threshold, a speed of a connection between the radio 128 and an AP 118 above a threshold, a type of traffic from the application(s) 122, a client load above a threshold, a channel utilization above a threshold, a number of missed beacons above a threshold, a number of dropped packets above a threshold, etc.

Once a roaming condition is detected via a radio 128, the driver 126 triggers the radio 128 to scan channel(s) for other APs 118 belonging to a particular set of network devices 114. In one embodiment, the driver 126 can determine which of the other APs 118 to connect to based on various metrics. For example, the metrics can include a channel utilization, client load, link speed, type of application traffic, etc. In some embodiments, the driver 126 can be configured to prevent multiple radios 128 from roaming at the same time. For example, assuming the client 120 includes two radios, the driver 126 can prevent the first radio from roaming while the second radio is roaming, and vice versa. Doing so can reduce the likelihood of the client 120 experiencing data interruptions via multiple radios when roaming.

Figure 2:
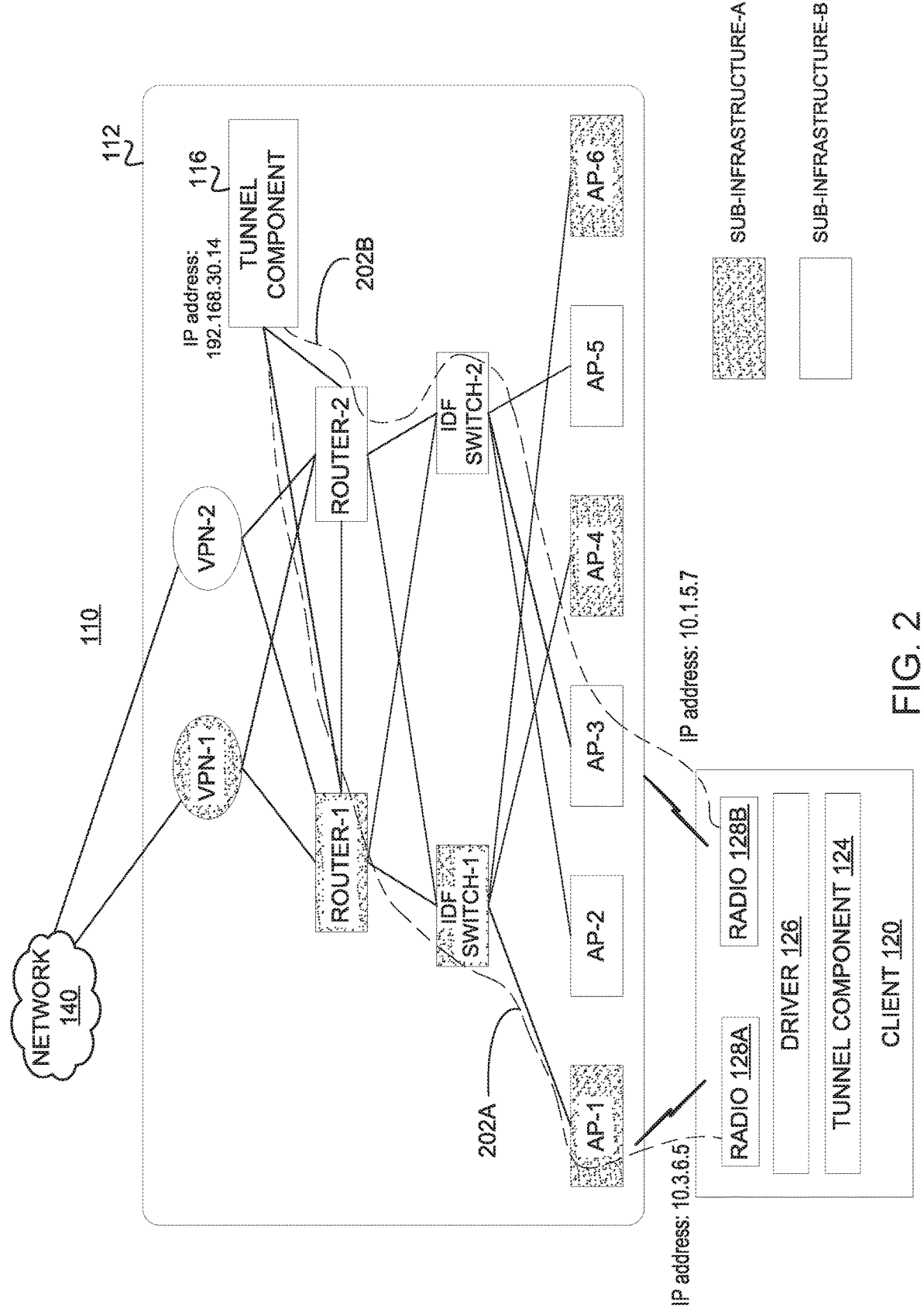
FIG. 2 is a block diagram further illustrating components of the wireless LAN illustrated in FIG. 1, according to one embodiment.

FIG. 2 is a block diagram further illustrating components of the wireless LAN 110 described relative to FIG. 1, according to one embodiment. In the depicted embodiment, client 120 is connected to the network 140 via network infrastructure 112. In this example, the network infrastructure 112 includes: six APs 1, 2, 3, 4, 5, and 6 (e.g., representative of APs 118); two routers 1 and 2, two IDF switches 1 and 2, and two virtual private network (VPN) endpoints 1 and 2 (e.g., representative of network devices 114); and the tunnel component 116.

It should be noted that the number of devices (e.g., switches, routers, APs, clients, etc.) and the arrangement of devices depicted in FIG. 2 are shown for the sake of clarity, and that a wireless network implementing the example embodiments described herein may have any number of switches, routers, APs, and clients, and have any suitable physical arrangement. For example, while the network infrastructure 112 is depicted as having a mesh topology, the network infrastructure 112 can have any other suitable network topology (e.g., hybrid, bus, tree, etc.). Similarly, while client 120 is depicted as having two radios 128A and 128B, the client 120 can have more than two radios 128.

In the depicted example, APs 1-6 are deployed into two different network sub-infrastructures A and B of the wireless LAN 110. The network sub-infrastructures A and B represent different sets of network devices 114 that provide the client 120 with redundant paths through the network infrastructure 112 to the network 140. Here, APs 1, 4, and 6 are located on (or connected to) network sub-infrastructure A, which provides a first path to the network 140 via IDF switch 1, router 1, and VPN endpoint 1. Similarly, APs 2, 3, and 5 are located on network sub-infrastructure B, which provides a second path to the network 140 via IDF switch 2, router 2, and VPN endpoint 2. While two network sub-infrastructures A and B are shown in this particular embodiment, the network infrastructure 112 can include any number of network sub-infrastructures suitable to provide clients 120 with redundant paths through the wireless LAN 110.

The driver 126 configures radios 128A and 128B to connect to the APs located in the different network sub-infrastructures A and B. The radio 128A is configured to connect to APs 1, 4, and 6 in network sub-architecture A and radio 128B is configured to connect to APs 2, 3, and 5 in network sub-architecture B. As shown, the radio 128A is currently connected to AP 1 and the radio 128B is currently connected to AP 3. By enabling the client 120 to connect to the wireless LAN 110 via multiple radios 128A and 128B, embodiments allow the client 120 to maintain at least one redundant connection to the wireless LAN 110, e.g., when roaming between APs, encountering AP failures, etc.

With multiple connections to the wireless LAN 110 established via the radios 128A and 128B, the client 120 can send and receive data across multiple paths (e.g., via both radios 128A and 128B) to achieve data redundancy. This, in turn, can minimize (and, in some cases, eliminate) data interruptions caused by roaming between cells, AP failures, degradation of an AP, backhaul network failures, etc. As shown in the depicted embodiment, the client 120 uses tunnel component 124 to create two IP tunnels 202A and 202B. The IP tunnel 202A is created between the IP address "10.3.6.5" for radio 128A and the IP address "192.168.30.14" for the tunnel component 116 along the path provided by the network sub-infrastructure A. The IP tunnel 202B is created between the IP address "10.1.5.7" for radio 128B and the IP address "192.168.30.14" for the tunnel component 116 along the path provided by the network sub-infrastructure B. Each of the IP tunnels 202A and 202B is created using a multipath transport protocol (e.g., multipath TCP). Note that the above IP addresses are provided as reference examples. Those of ordinary skill in the art will recognize that the radio 128A, radio 128B and tunnel component 116 can have other IP addresses.

In one embodiment, the tunnel component 124 and the tunnel component 116, which are the endpoints of the IP tunnels 202A and 202B, can use the multipath transport protocol (e.g., multipath TCP) to send packets across the redundant paths through the network infrastructure 112. Assuming multipath TCP is used as the multipath transport protocol, a TCP session can be created for each IP tunnel 202A and 202B. The tunnel component 124 can receive a packet (e.g., from application(s) 122) at its tunnel interface, replicate the packet, and send the packets over the IP tunnels 202A and 202B to the tunnel interface provided by the tunnel component 116. In some embodiments, the IP addresses for radio 128A and 128B may be transparent to application(s) 122. That is, packets from the application(s) 122 may appear to come from the IP address ("192.168.30.14") at the tunnel component 116. In one embodiment, radios 128A and 128B are assigned to different logical subnetworks to force packets to travel through the distinct paths through the network infrastructure 112.

In one embodiment, the tunnel component 116 is configured to retain the packet from the IP tunnel (e.g., IP tunnel 202A or 202B) that has the lowest latency. That is, the tunnel component 116 takes the packet that arrives first from one of the IP tunnels 202A and 202B and discards the other packet. This can significantly reduce latency of communications for latency sensitive applications, e.g., industrial control applications. The tunnel component 116 can then route the (retained) packet to the network 140 via one of the routers 1 and 2.

As noted, embodiments described herein (e.g., with respect to FIGS. 3-6) provide various techniques that enable a client 120 to determine which APs 118 deployed in a given environment belong to the different network sub-infrastructures (e.g., sets of network devices 114) in a wireless LAN 110. Note that while each of the scenarios depicted in FIGS. 3-6 includes six APs and a single client 120, embodiments can include any number of APs and clients.

Figure 3:
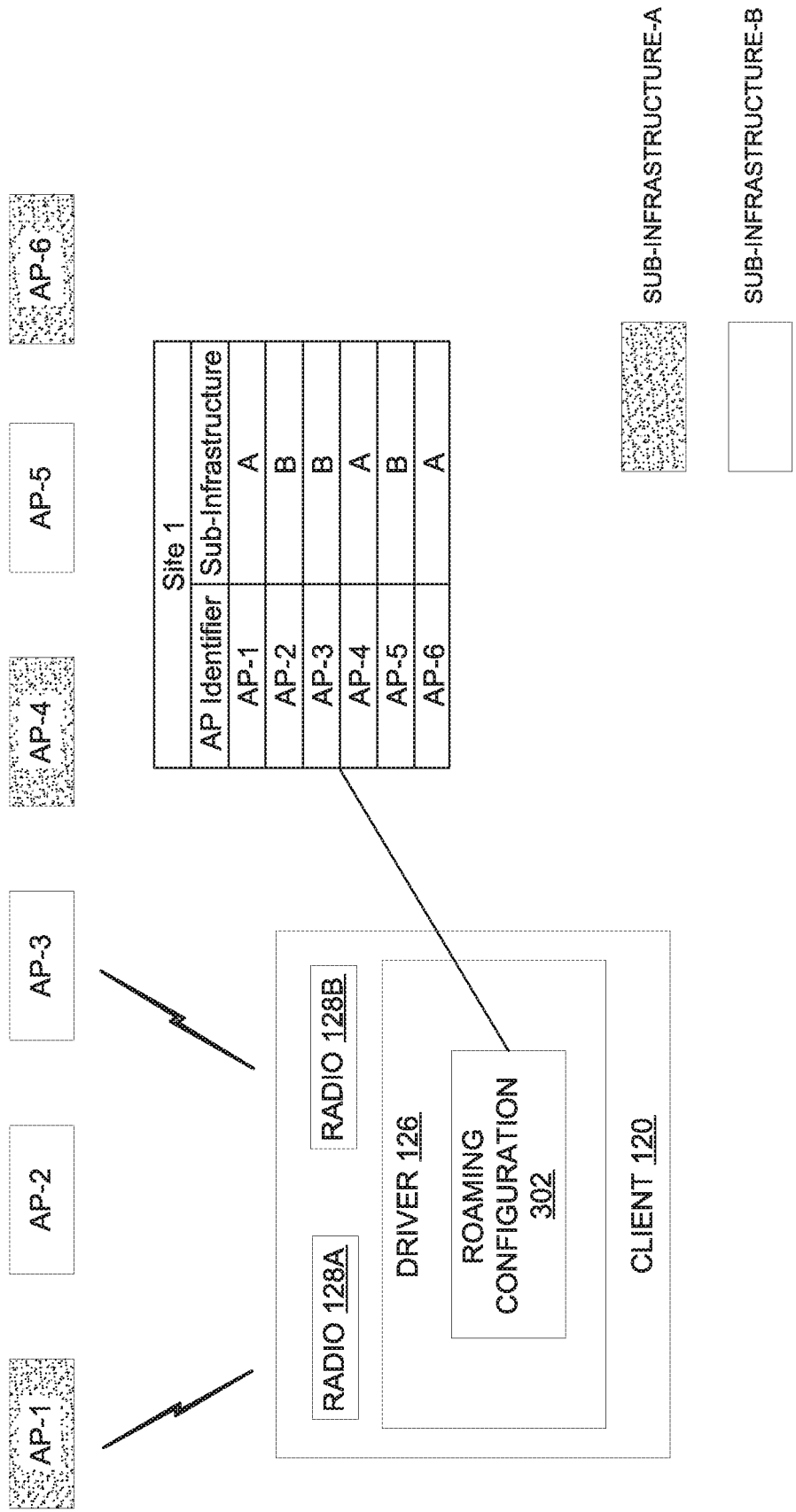
FIG. 3 illustrates an example scenario of determining which APs in a wireless LAN belong to different network infrastructures in an environment, according to one embodiment.

FIG. 3 illustrates an example scenario in which the client 120 uses a roaming configuration 302 to determine the APs 118 that belong to the different network sub-infrastructures within a wireless LAN 110, according to one embodiment. The roaming configuration 302 includes: (1) the AP identifiers (e.g., MAC addresses) that are deployed within a given wireless LAN 110 of an environment; and (2) an indication of the network sub-infrastructure corresponding to each AP identifier. Here, for example, the roaming configuration 302 indicates that: (1) AP identifiers "AP-1," "AP-2," "AP-3," "AP-4," "AP-5," and "AP-6" are deployed within a wireless LAN 110 in "Site 1"; (2) AP identifiers "AP-1," "AP-4," and "AP-6" are located on network sub-infrastructure A; and (3) AP identifiers "AP-2," "AP-3," and "AP-5" are located on network sub-infrastructure B. In one embodiment, the driver 126 may retrieve the roaming configuration 302 (e.g., for "Site 1") from the controller 102. For example, the driver 126 may send a request for the roaming configuration 302 after powering on, entering a new environment (e.g., "Site 2"), etc.

In one embodiment, the driver 126 can use roaming configuration 302 to sort the APs 118 between the radios 128A and 128B. Here, the radio 128A is connected to AP 1 (on network sub-infrastructure A) and radio 128B is connected to AP 3 (on network sub-infrastructure B). Since the radios 128A and 128B identify an AP 118 that is present within a cell based on the "AP identifier" included in a beacon received from the AP 118, the driver 126 can sort the radios 128A and 128B by configuring the radios 128A and 128B to filter (e.g., not recognize) beacons belonging to APs in a given network sub-infrastructure. In this particular example, the driver 126 can configure radio 128A to filter beacons from the AP identifiers located on sub-infrastructure B (e.g., making the radio 128A blind to the presence of APs on sub-infrastructure B) in order to force radio 128A to roam between the APs located on network sub-infrastructure A. Similarly, the driver 126 can configure radio 128B to filter beacons from the AP identifiers located on sub-infrastructure A (e.g., making the radio 128B blind to the presence of APs on sub-infrastructure A) in order to force radio 128B to roam between the APs located on network sub-infrastructure B.

Figure 4:
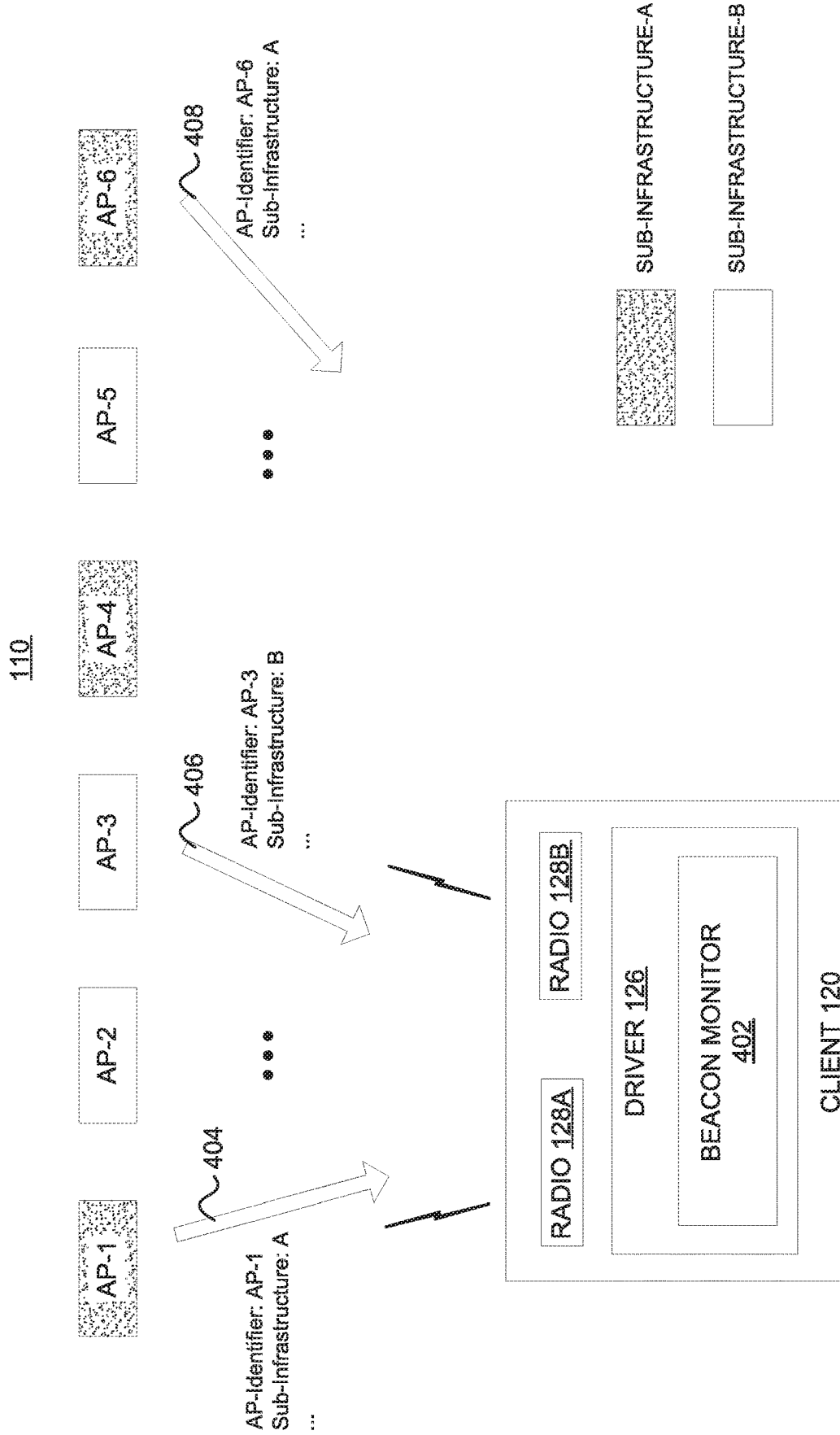
FIG. 4 illustrates another example scenario of determining which APs in a wireless LAN belong to different network infrastructures in an environment, according to one embodiment.

FIG. 4 illustrates an example scenario in which the client 120 uses a beacon monitor 402 to determine the APs 118 that belong to the different network sub-infrastructures within a wireless LAN 110, according to one embodiment. The driver 126 uses the beacon monitor 402 to analyze beacons received from the APs 1-6. In one embodiment, each beacon from an AP may include an attribute "Sub-infrastructure" indicating which network sub-infrastructure in the wireless LAN 110 is associated with the AP. By way of example, the "Sub-infrastructure" attribute in beacon 404 (from AP 1) indicates that AP 1 belongs to network sub-infrastructure A, the "Sub-infrastructure" attribute in beacon 406 (from AP 3) indicates that AP 3 belongs to network sub-infrastructure B, and the "Sub-infrastructure" attribute in beacon 408 (from AP 6) indicates that AP 6 belongs to network sub-infrastructure A.

The driver 126 sorts the radios 128A and 128B among APs 1-6 based on the sub-infrastructure configured for each radio 128A and 128B. For example, since radio 128A is configured for network sub-infrastructure A, the radio 128A roams between APs 1, 4, and 6 located on network sub-infrastructure A. Similarly, since radio 128B is configured for network sub-infrastructure B, the radio 128B roams between APs 2, 3, and 5 located on network sub-infrastructure B. By allowing clients 120 to use a beacon monitor 402 to determine the different network sub-infrastructures within a wireless LAN 110, embodiments can improve the flexibility and performance of the communication system 100, e.g., compared to system deployments in which clients 120 have to request a roaming configuration to determine such information. In addition, by allowing clients 120 to use the beacon monitor 402, the beacons of any AP can be modified (e.g., via software) without affecting operation of the clients 120. For example, an administrator can reallocate APs to different network sub-infrastructures within the wireless LAN by changing the "Sub-infrastructure" attribute in the beacons from the APs.

Figure 5:
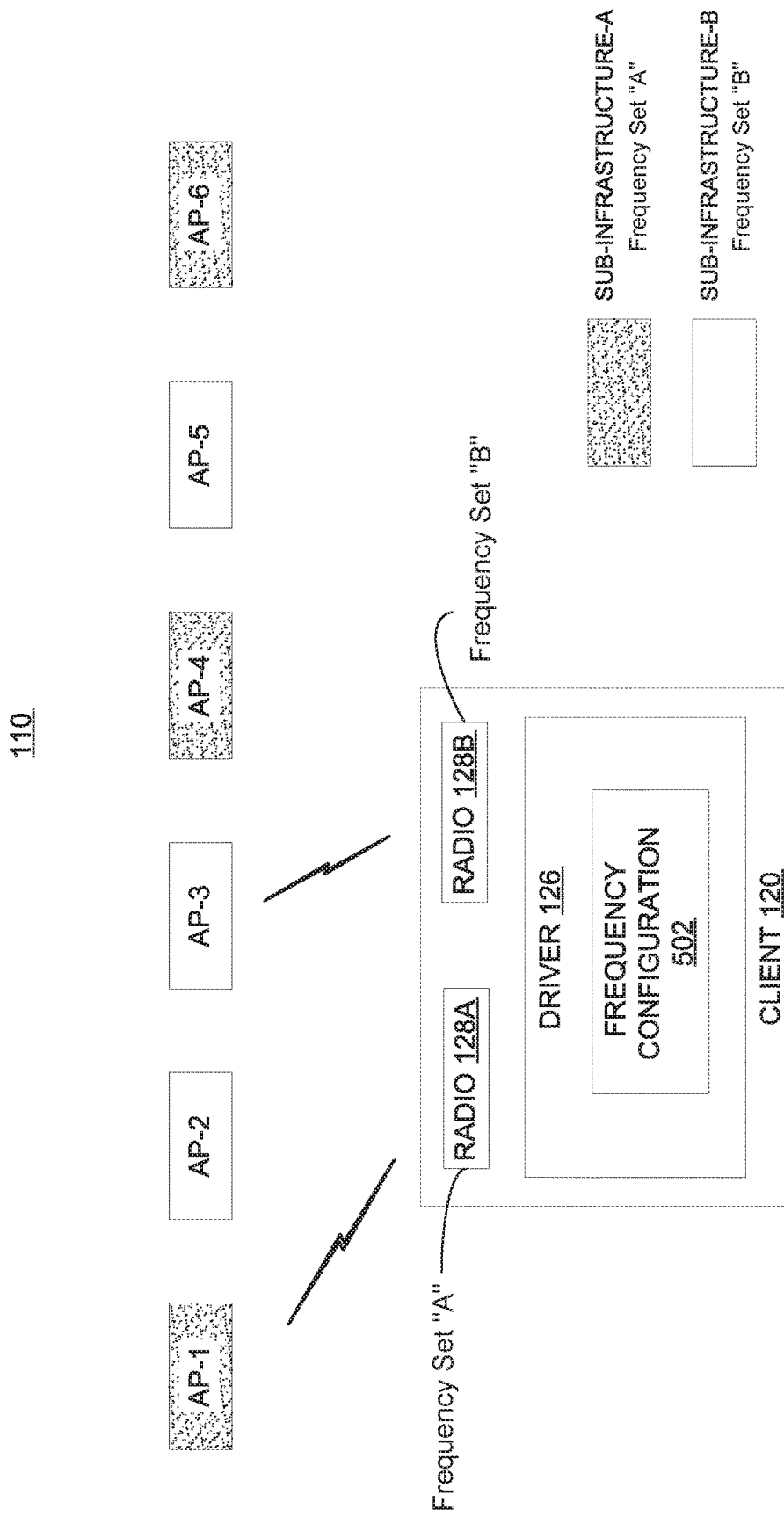
FIG. 5 illustrates another example scenario of determining which APs in a wireless LAN belong to different network infrastructures in an environment, according to one embodiment.

FIG. 5 illustrates an example scenario in which the client 120 determines the APs 118 that belong to the different network sub-infrastructures within a wireless LAN 110 based on a frequency configuration 502 for the client 120, according to one embodiment. The driver 126 uses the frequency configuration 502 to configure the operating frequency (or set of frequencies) for radios 128A and 128B. Here, the radio 128A is configured to operate (e.g., scan for beacons) on frequency set A and the radio 128B is configured to operate on frequency set B. In one embodiment, the sets of frequencies for radios 128A and 128B may correspond to different bands. For example, the radio 128A can be configured to operate on a first frequency band (e.g., 5 GHz band) and the radio 128B can be configured to operate on a second frequency band (e.g., 2.4 GHz band). In one embodiment, a set of frequencies may correspond to different groupings of channels within one or more bands. For example, the radio 128A can be configured to operate on a first number of channels from a first frequency band (e.g., Unlicensed National Information Infrastructure (U-NII)-C band) and a second number of channels from a second frequency band (e.g., UNII-1 band), and the radio 128B can be configured to operate on a third number of channels from a third frequency band (e.g., UNII-2 band) and a fourth number of channels from a fourth frequency band (e.g., UNII-3 band).

In some embodiments, the APs in each network sub-infrastructure of the wireless LAN 110 can also be configured to operate on a particular set of frequencies. For example, APs 1, 4, 6 located in network sub-infrastructure A are configured to operate on frequency set A and APs 2, 3, 5 located in network sub-infrastructure B are configured to operate on frequency set B. As shown, when configured in this manner, radio 128A is able to scan for beacons on frequency set A from AP 1 and connect to AP 1. Similarly, radio 128B is able to scan for beacons on frequency set B from AP 3 and connect to AP 3. By using a frequency configuration to determine which APs are on the different network sub-infrastructures, clients 120 can avoid requesting the information from the controller 102.

Figure 6:
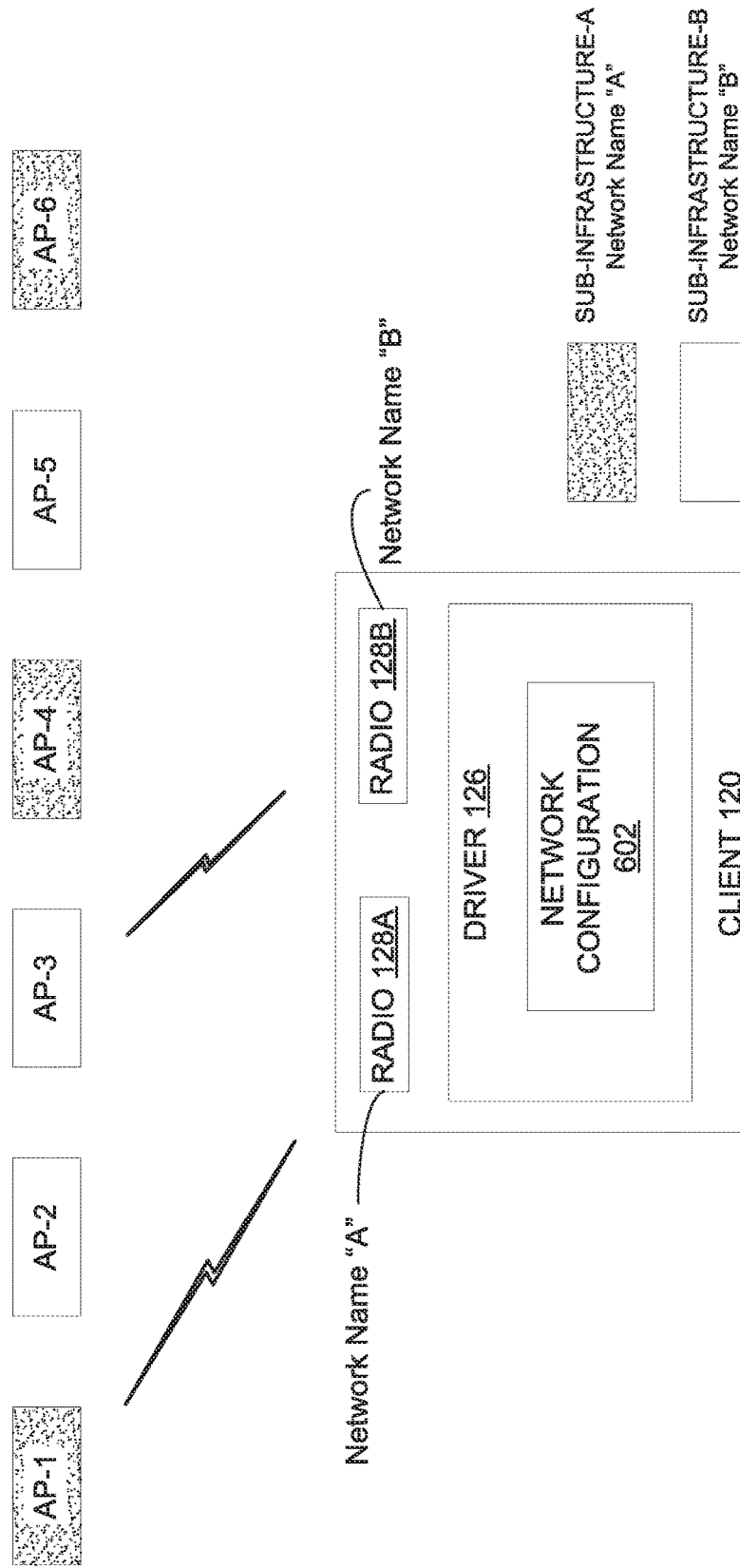
FIG. 6 illustrates another example scenario of determining which APs in a wireless LAN belong to a different network infrastructures in an environment, according to one embodiment.

FIG. 6 illustrates an example scenario in which the client 120 determines the APs 118 that belong to the different network sub-infrastructures within a wireless LAN 110 based on a network configuration 602 for the client 120, according to one embodiment. In this embodiment, the driver 126 configures the radios 128A and 128B to join different network names (e.g., SSIDs) based on the network configuration 602. As shown, radio 128A is configured to join "Network Name A" (e.g., SSID A) and radio 128B is configured to join "Network Name B" (e.g., SSID B). In some embodiments, the APs in each network sub-infrastructure of the wireless LAN 110 can also be deployed to a different network name. Here, for example, APs 1, 4, 6 located in network sub-infrastructure A are deployed to "Network Name A" and APs 2, 3, 5 located in network sub-infrastructure B are deployed to "Network Name B." By enabling clients 120 to use a network configuration 602 to sort the radios among the different network sub-infrastructures, the clients 120 can avoid requesting the information from the controller 102.

Figure 7A:
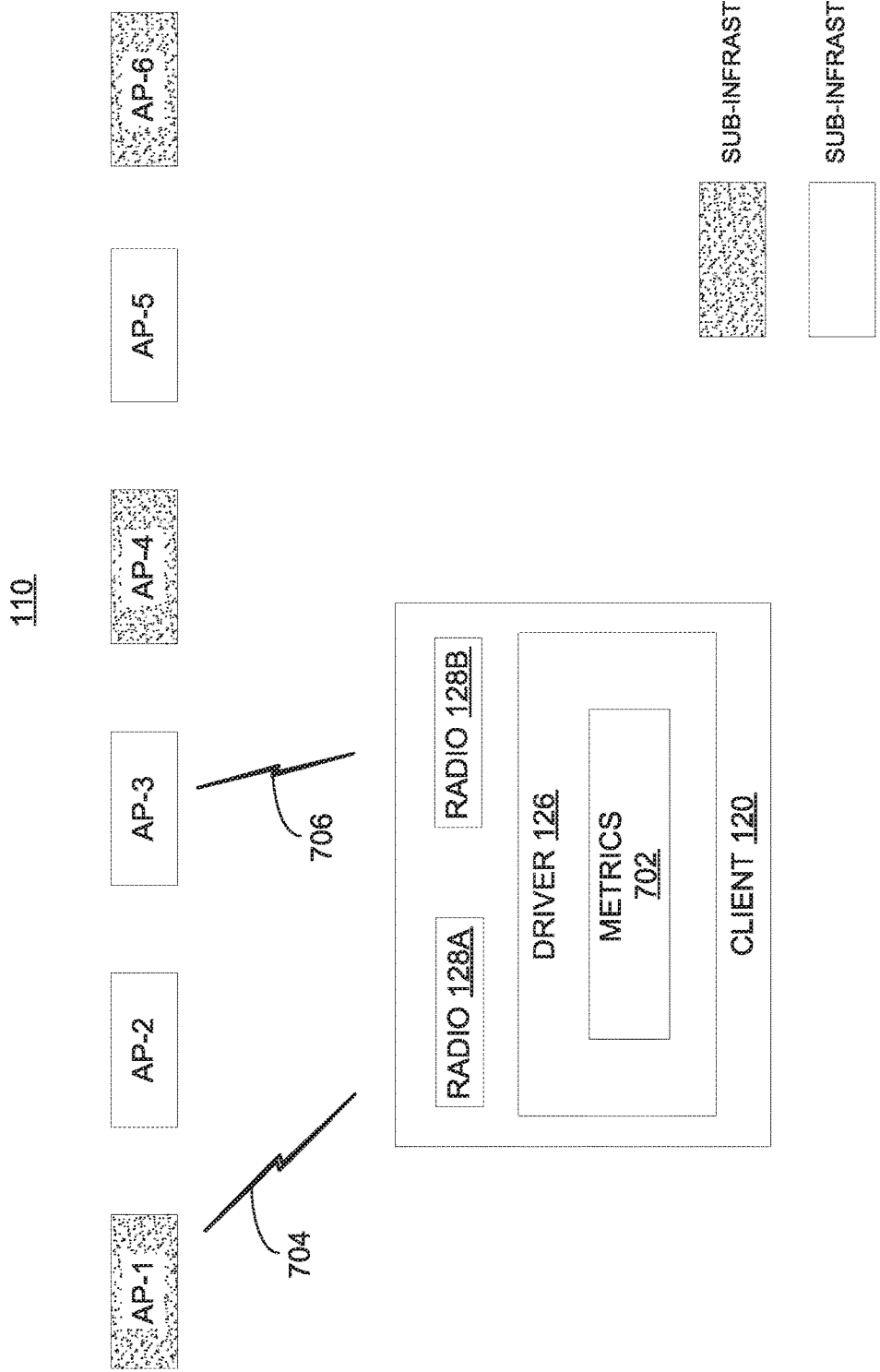
FIGS. 7A-7C illustrate an example scenario of a client roaming from a first AP to a second AP after detecting a roaming condition with respect to the first AP, according to one embodiment.
Figure 7B:
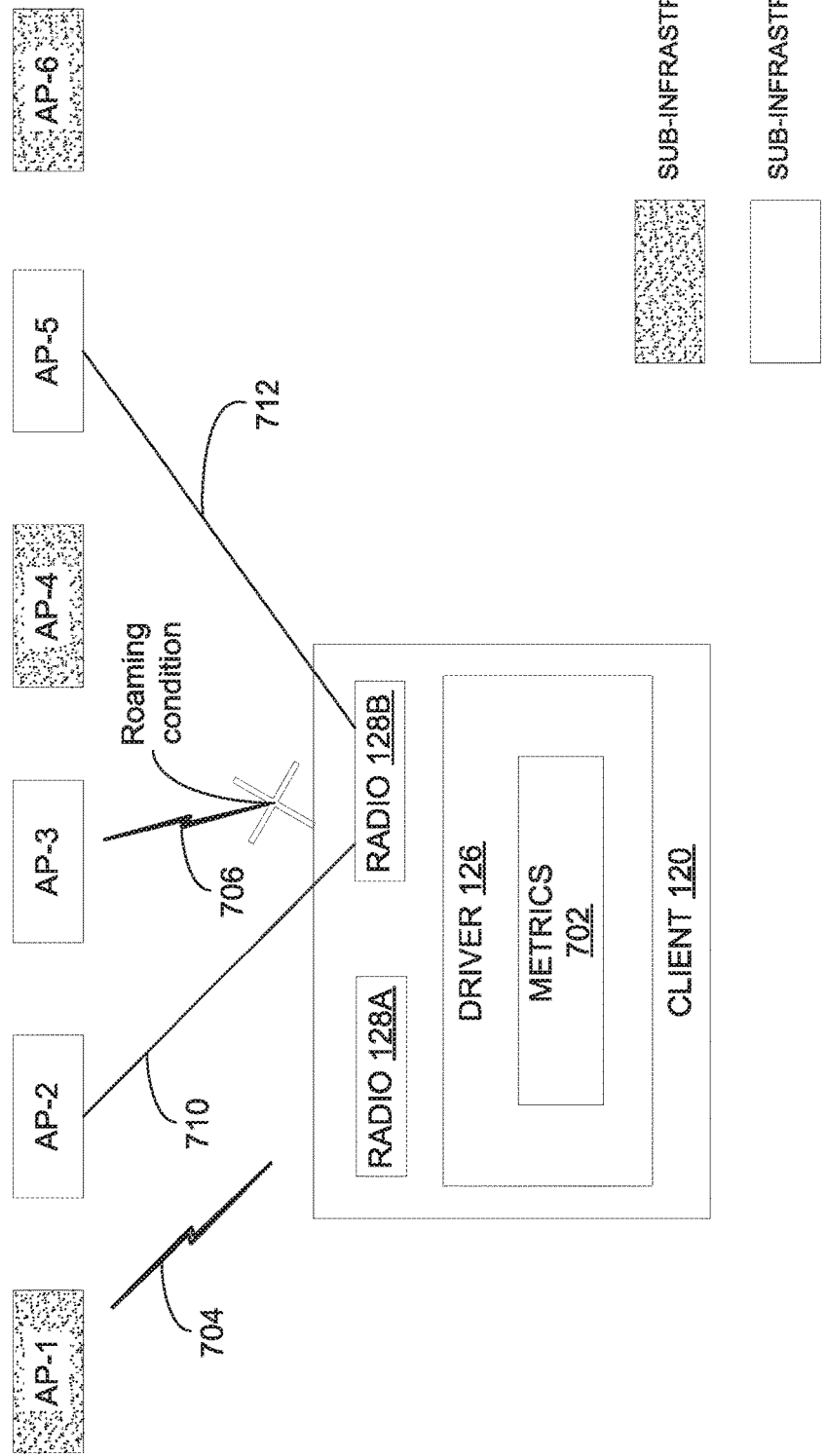
Figure 7C:
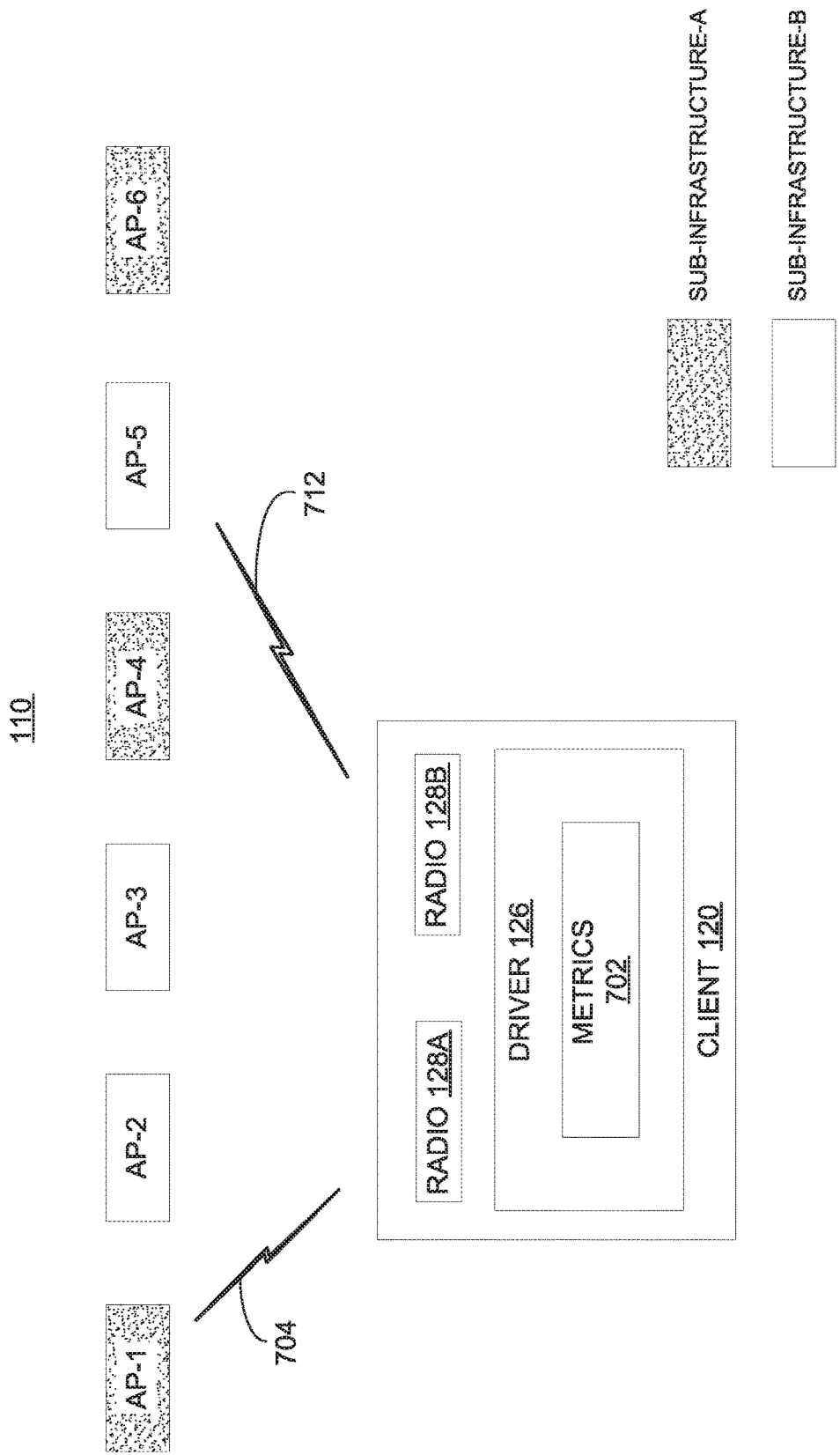

FIGS. 7A-7C illustrate a reference example of a roaming process in which a client 120 roams with a first radio to a different AP in response to detecting a roaming condition, according to one embodiment. Referring first to FIG. 7A, the client 120 is connected to AP 1 (located on network sub-infrastructure A) via a wireless link 704 established between radio 128A and AP 1, and is connected to AP 3 (located on network sub-infrastructure B) via a wireless link 706 established between radio 128B and AP 3. As discussed above, when configured in this manner, the client 120 can communicate data (from the radios 128A and 128B) across redundant paths through the wireless LAN (e.g., to the tunnel component 116). In one embodiment, the driver 126 uses metrics 702 to determine which APs to connect to radios 128A and 128B. Examples of metrics 702 include, but are not limited to, a channel utilization, client load, link speed, a type of application traffic, etc.

Subsequently, as shown in FIG. 7B, the client 120 detects a roaming condition with respect to the wireless link 706 (e.g., between radio 128B and AP 3). This triggers the client 120 to roam using radio 128B to a different AP. In one example, the roaming condition can include detecting that the signal strength of AP 3 is below a threshold. In another example, the roaming condition can include determining that a number of beacons missed by radio 128B (e.g., from AP 3) is above a threshold. In yet another example, the roaming condition can include determining that a number of packets lost (or a number of packet retries) by the radio 128B is above a threshold. In yet another example, the roaming condition can include determining that at least one of a client load and channel utilization for the AP 3 is above a threshold. In still another example, the roaming condition can include detecting that a type of application traffic (e.g., from application 122) is unsuitable for the wireless link 706 (e.g., the wireless link 706 may not be able to support speed, bandwidth, etc., of the type of application traffic).

In response to detecting the roaming condition on wireless link 706, the driver 126 triggers radio 128B to roam to a different AP located on network sub-infrastructure B. Here, radio 128B roams to AP 2 and AP 5, which are located on network sub-infrastructure B, in response to detecting the roaming condition for AP 3. The client 120 can determine the APs that are located on network sub-infrastructure B using any of the techniques described above with reference to FIGS. 3-6.

The driver 126 uses metrics 702 to determine whether to connect to AP 2 via wireless link 710 or AP 5 via wireless link 712. In one embodiment, the determination is based on at least one of a channel utilization and client load for each AP. For example, the client 120 may prioritize APs that have lower channel utilization and/or lower client load compared to other APs in the same network sub-infrastructure. Assume, for example, the client 120 determines that AP 2 would support a higher data rate (e.g., via wireless link 710) compared to AP 5 (e.g., via wireless link 712), but that the client load for AP 2 is twenty clients and the client load for AP 5 is two clients. In this reference example, the client 120 may choose to switch to AP 5, despite it supporting a lower data rate, due to it having a lower client load. The driver 126 can determine the channel utilization and client load for each AP from beacons received from the AP. Using the 802.11 beacon as a reference example, the quality of service (QoS) basic service set (QBSS) element in the 802.11 beacon may indicate the client load and channel utilization for the AP.

While roaming between APs 2 and 5 with radio 128B, the client 120 maintains the connection to AP 1 via radio 128A. As discussed above, by maintaining another connection to a different AP via another radio, the client 120 can continue communicating data (e.g., using multipath TCP) associated with a communication session without dropping packets or experiencing a data interruption due to roaming to a different AP. As shown in FIG. 7C, the client 120 completes the roaming procedure by establishing the wireless link 712 between radio 128B and AP 5.

Figure 8:
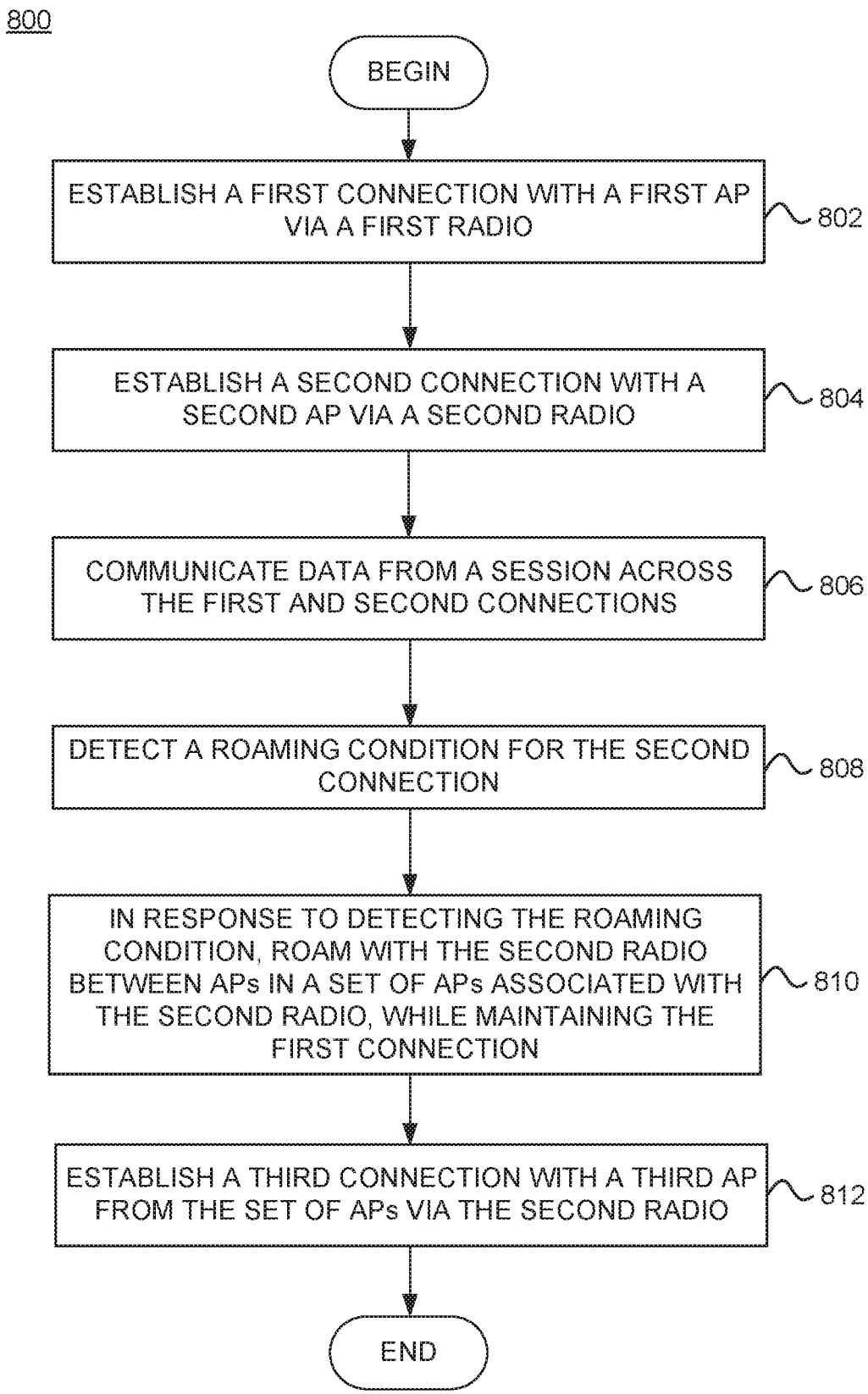
FIG. 8 is a flow chart illustrating a method for providing fault tolerance for wireless communications within a wireless LAN, according to one embodiment.

FIG. 8 is a flowchart illustrating a method 800 for providing fault tolerance for wireless communications within a wireless network (e.g., wireless LAN 110), according to one embodiment. The method 800 may be performed by a client 120.

The method 800 begins at block 802, where the client 120 establishes a first connection (e.g., wireless link 704) with a first AP (e.g., AP 118, such as AP 1) via a first radio (e.g., radio 128A). At block 804, the client 120 establishes a second connection (e.g., wireless link 706) with a second AP (e.g., AP 118, such as AP 3) via a second radio (e.g., radio 128B). At block 806, the client 120 communicates data from a communication session across the first and second connections. For example, as discussed above, the client 120 can use multipath transport protocol (e.g., multipath TCP) to send the same data (from the first radio and the second radio) across redundant paths through the wireless network.

At block 808, the client 120 detects a roaming condition for the second connection. As discussed, such a roaming condition can include any of a signal strength of an AP 118 below a threshold, a speed of a connection between the radio 128 and an AP 118 above a threshold, a type of traffic from the application(s) 122, a client load above a threshold, a channel utilization above a threshold, a number of missed beacons above a threshold, a number of dropped packets above a threshold, etc. At block 810, in response to detecting the roaming condition, the client 120 roams with the second radio between APs (e.g., APs 2 and 5) in a set of APs associated with the second radio (e.g., APs in network sub-infrastructure B), while communicating the data across the first connection via the first radio. At block 812, the client 120 establishes a third connection (e.g., wireless link 712) with a third AP (e.g., AP 5) from the set of APs via the second radio. In another embodiment, the client 120 can detect a roaming condition for the first connection (block 808) and roam with the first radio between APs (e.g., APs 4 and 6) in a set of APs associated with the first radio (e.g., APs in network sub-infrastructure A), while communicating the data across the second connection via the second radio.

Figure 9:
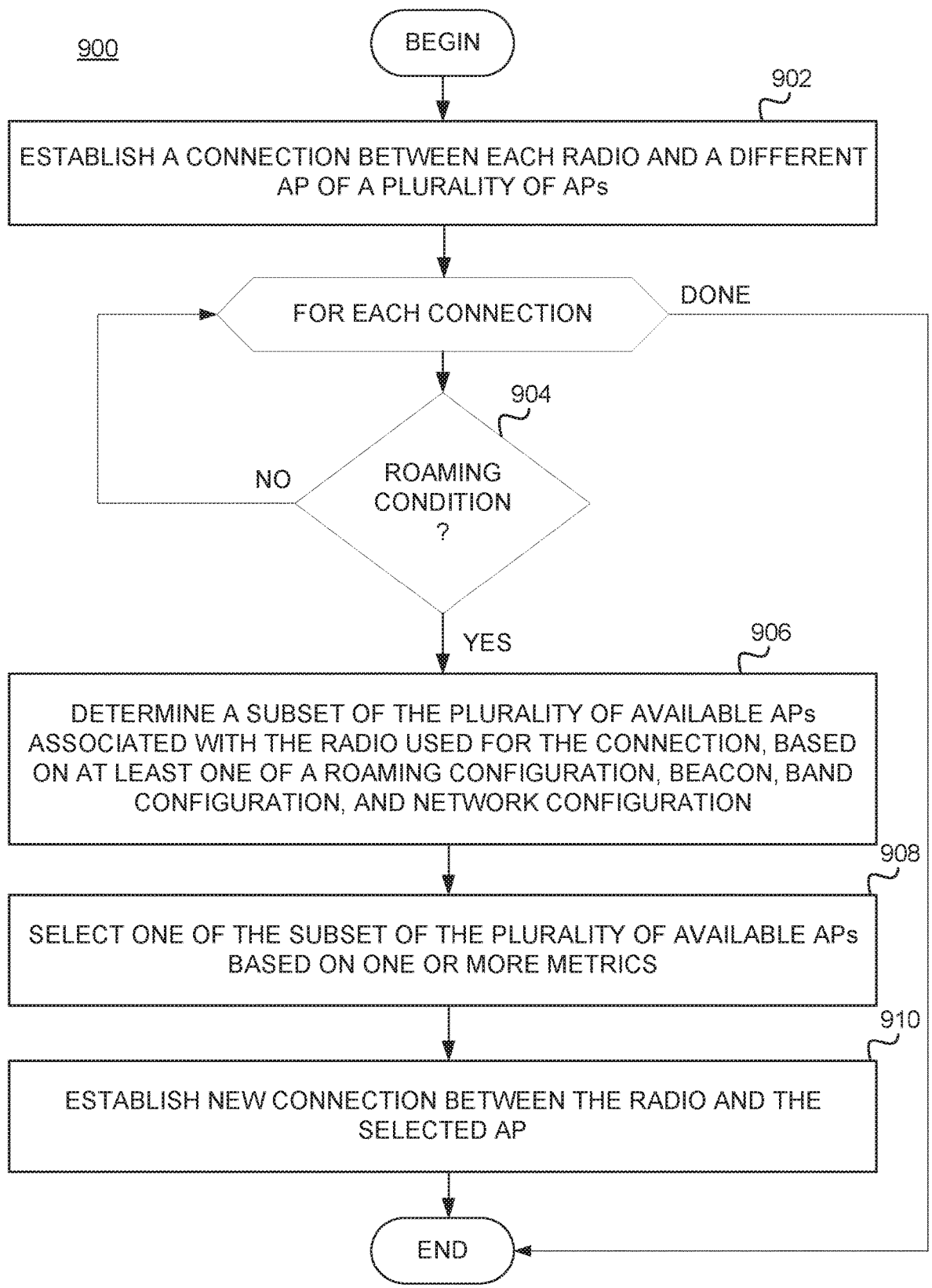
FIG. 9 is a flow chart illustrating a method for roaming between APs in a wireless LAN, according to one embodiment.

FIG. 9 is a flowchart illustrating a method 900 for roaming between APs in a network sub-infrastructure of a wireless network (e.g., wireless LAN 110), according to one embodiment. The method 900 may be performed by a client 120.

The method 900 begins at block 902, where the client 120 establishes a connection between each radio (e.g., radio 128) on the client 120 and a different AP of a plurality of APs in the wireless network. In one embodiment, each radio on the client 120 is an 802.11 radio and the wireless network is an 802.11 wireless LAN (e.g., WiFi network). For each connection, the client 120 determines if there is a roaming condition (block 904). If a roaming condition is not detected, the method ends. On the other hand, if the client 120 does detect a roaming condition on one of the connections (block 904), the client 120 determines a subset of the plurality of APs associated with the radio used for the connection, based on at least one of a roaming configuration, beacon(s), frequency configuration, and network configuration (block 906). At block 908, the client 120 selects one of the subset of the plurality of available APs based on one or more metrics (e.g., metrics 702). At block 910, the client 120 establishes a new connection between the radio and the selected AP.

Figure 10:
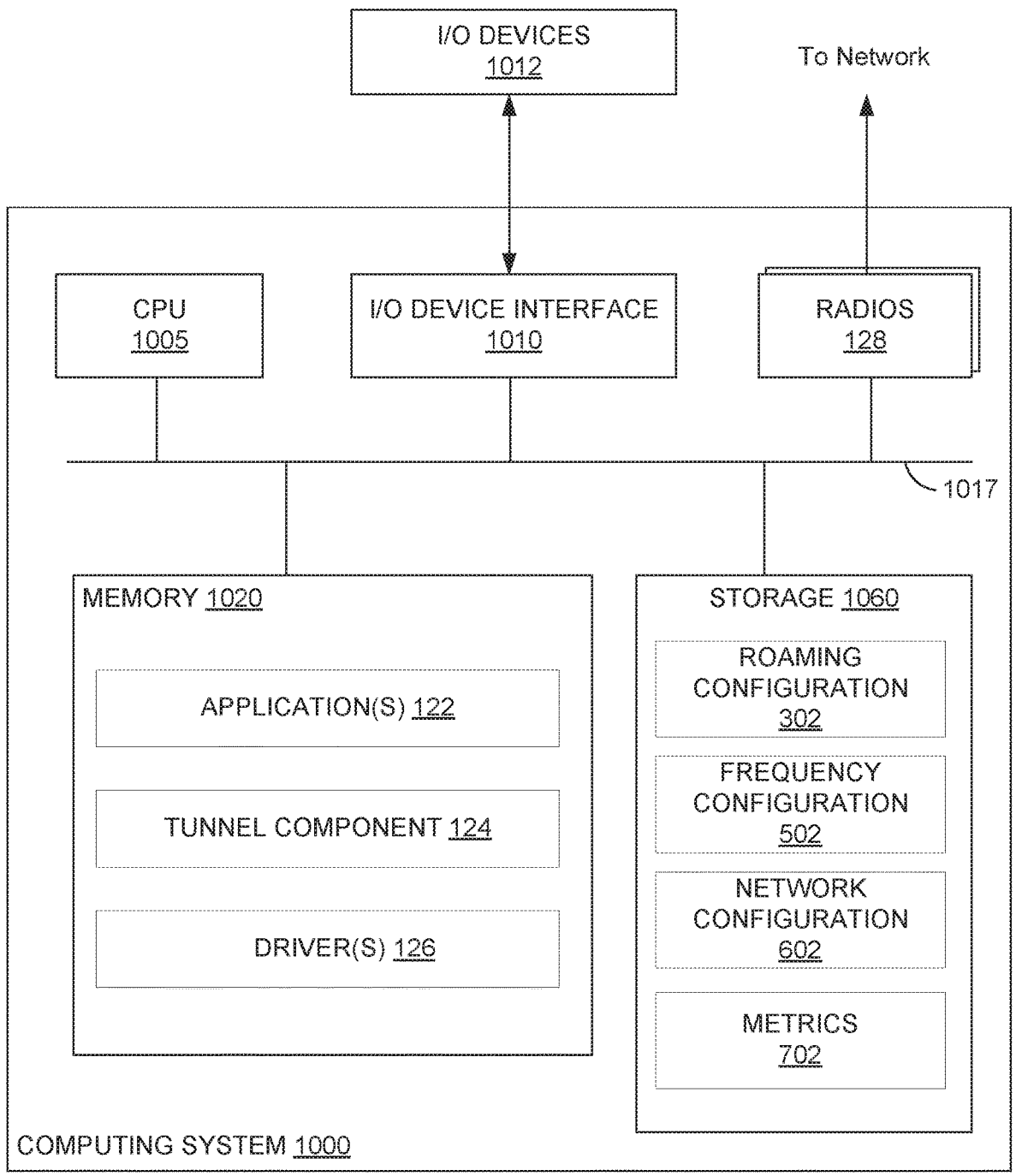
FIG. 10 is a block diagram illustrating a computing system configured to use multiple radios for connecting to a wireless LAN, according to one embodiment.

FIG. 10 illustrates a computing system 1000 configured with multiple radios for connecting to a same wireless network (e.g., wireless LAN), according to one embodiment. As shown, the computing system 1000 includes, without limitation, a central processing unit (CPU) 1005, multiple radios 128 (e.g., 802.11 radios), a memory 1020, and storage 1060, each connected to a bus (or interconnect) 1017. The computing system 1000 may also include an I/O device interface 1010 connecting I/O devices 1012 (e.g., keyboard, mouse, and display devices) to the computing system 1000. Further, in context of this disclosure, the computing elements shown in the computing system 1000 may correspond to a physical computing system (e.g., a system in a data center) or may be a virtual computing instance executing within a computing cloud. In one embodiment, the computing system 1000 can be an example of the client 120 illustrated in FIG. 1.

The CPU 1005 retrieves and executes programming instructions stored in the memory 1020 as well as stores and retrieves application data residing in the memory 1020. The bus 1017 is used to transmit programming instructions and application data between CPU 1005, I/O devices interface 1010, storage 1060, network interface 1015, and memory 1020. Note CPU 1005 is included to be representative of a single CPU, multiple CPUs, a single CPU having multiple processing cores, and the like. Memory 1020 is generally included to be representative of a random access memory. The storage 1060 may be a disk drive storage device. Although shown as a single unit, storage 1060 may be a combination of fixed and/or removable storage devices, such as fixed disc drives, removable memory cards, or optical storage, network attached storage (NAS), or a storage area-network (SAN). The storage 1060 includes roaming configuration 302, frequency configuration 502, network configuration 602, and metrics 702, which are described in more detail above. In some embodiments, the storage 1060 also includes beacon information (e.g., information obtained from beacons received from APs). Illustratively, the memory 1020 includes application(s) 122, the tunnel component 124, and the driver(s) 126, which are described in more detail above. In some embodiments, the driver(s) 126 may include the beacon monitor 402, which is described in more detail above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for providing fault tolerance for wireless communications by an apparatus, comprising:
    establishing a first connection with a first access point (AP) of a plurality of APs via a first radio of the apparatus;
    establishing a second connection with a second AP of the plurality of APs via a second radio of the apparatus, wherein:
        the first AP and the second AP are connected to a same wireless local area network (LAN);
        the first AP is associated with a first physical path through a backhaul network of the wireless LAN; and
        the second AP is associated with a second physical path through the backhaul network;
    communicating same data associated with a communication session via the first connection and the second connection, comprising:
        establishing a first tunnel between the first radio and the wireless LAN via the first connection; and
        establishing a second tunnel between the second radio and the wireless LAN via the second connection, wherein the same data is communicated through the first tunnel and the second tunnel using a multipath transport protocol;
    detecting a failure of the second connection with the second AP; and
    establishing, in response to the detection, a third connection with a third AP of the plurality of APs via the second radio of the apparatus while communicating data via the first connection with the first AP, wherein the third AP is associated with the second physical path through the backhaul network.

2. The method of claim 1, wherein the first radio and the second radio are connected to different logical subnetworks of the wireless LAN.

3. The method of claim 1, wherein the first tunnel and the second tunnel are established using the multipath transport protocol.

4. The method of claim 1, further comprising determining a first subset of the plurality of APs associated with a first network infrastructure of the wireless LAN and a second subset of the plurality of APs associated with a second network infrastructure of the wireless LAN, wherein the first network infrastructure corresponds to the first physical path through the backhaul network and the second network infrastructure corresponds to the second physical path through the backhaul network.

5. The method of claim 4, further comprising receiving a configuration indicating which of the plurality of APs are associated with the first network infrastructure and the second network infrastructure, wherein the first subset of the plurality of APs and the second subset of the plurality of APs are determined based on the configuration.

6. The method of claim 4, further comprising receiving a beacon from each of the plurality of APs indicating whether the AP is associated with the first network infrastructure or the second network infrastructure, wherein the first subset of the plurality of APs and the second subset of the plurality of APs are determined based on the beacons.

7. The method of claim 4, wherein the first subset of the plurality of APs and the second subset of the plurality of APs are determined based on a set of frequencies associated with each of the first radio of the apparatus and the second radio of the apparatus.

8. The method of claim 7, wherein:
    the first subset of the plurality of APs and the first radio of the apparatus are configured for a first set of frequencies; and
    the second subset of the plurality of APs and the second radio of the apparatus are configured for a second set of frequencies.

9. The method of claim 4, wherein the first subset of the plurality of APs and the second subset of the plurality of APs are determined based on a network name associated with each of the first radio of the apparatus and the second radio of the apparatus.

10. The method of claim 4, further comprising:
    roaming between APs in the second subset of the plurality of APs in response to the detection, wherein the first AP is in the first subset of the plurality of APs; and
    selecting one of the APs in the second subset of the plurality of APs as the third AP based on one or more criteria.

11. A computing device, comprising:
    a first radio;
    a second radio;

a processor; and a memory storing one or more applications, which, when executed on the processor, perform an operation comprising:

establishing a first connection with a first access point (AP) of a plurality of APs via the first radio;

establishing a second connection with a second AP of the plurality of APs via the second radio, wherein:

the first AP and the second AP are connected to a same wireless local area network (LAN);

the first AP is associated with a first physical path through a backhaul network of the wireless LAN; and the second AP is associated with a second physical path through the backhaul network;

communicating same data associated with a communication session via the first connection and the second connection, comprising:

establishing a first tunnel between the first radio and the wireless LAN via the first connection; and establishing a second tunnel between the second radio and the wireless LAN via the second connection, wherein the same data is communicated through the first tunnel and the second tunnel using a multipath transport protocol;

detecting a failure of the second connection with the second AP; and establishing, in response to the detection, a third connection with a third AP of the plurality of APs via the second radio, while communicating data over the first connection with the second AP, wherein the third AP is associated with the second physical path through the backhaul network.

12. The computing device of claim 11, wherein the first radio and the second radio are connected to different logical subnetworks of the wireless LAN.

13. The computing device of claim 11, the operation further comprising determining a first subset of the plurality of APs associated with a first network infrastructure of the wireless LAN and a second subset of the plurality of APs associated with a second network infrastructure of the wireless LAN, based on at least one of: (i) a configuration indicating the first subset of the plurality of APs and the second subset of the plurality of APs; (ii) a beacon received from each of the plurality of APs indicating the AP is in the first subset of the plurality of APs or the second subset of the plurality of APs; (iii) a set of frequencies associated with each of the first radio and the second radio; and (iv) a network name associated with each of the first radio and the second radio.

14. The computing device of claim 13, wherein the first network infrastructure corresponds to the first physical path through the backhaul network and the second network infrastructure corresponds to the second physical path through the backhaul network.

15. An apparatus, comprising:

a first 802.11 radio;

a second 802.11 radio;

a processor; and a memory storing one or more applications, which, when executed on the processor, perform an operation comprising:

establishing a first connection with a first access point (AP) of a plurality of APs via the first 802.11 radio;

establishing a second connection with a second AP of the plurality of APs via the second 802.11 radio, wherein the first AP and the second AP are connected to a same local area network (LAN);

establishing a first tunnel between the first 802.11 radio and the LAN via the first connection;

establishing a second tunnel between the second 802.11 radio and the LAN via the second connection;

sending, via the first tunnel, a first packet associated with a communication session along a first path through the LAN;

sending, via the second tunnel, the first packet associated with the communication session along a second path through the LAN using a multipath transport protocol;

after sending the first packet via the first and second connections, detecting a failure of the second connection with the second AP; and in response to detecting the failure, roaming to a third AP of the plurality of APs while sending, via the first connection, a second packet associated with the communication session along the first path through the LAN.

16. The apparatus of claim 15, wherein:

the first path comprises a first set of network devices connected to a first intermediate distribution frame (IDF) within a backhaul of the LAN; and the second path comprises a second set of network devices connected to a second IDF within the backhaul of the LAN.

17. The computing device of claim 13, the operation further comprising:

roaming between APs in the second subset of the plurality of APs in response to the detection, wherein the first AP is in the first subset of the plurality of APs; and selecting one of the APs in the second subset of the plurality of APs as the third AP based on one or more criteria.

* * * * *